United States Patent [19]

Hutchings

[11] 3,915,847

[45] Oct. 28, 1975

[54] DISTRIBUTION OF LIQUID-VAPOR FEEDS IN PACKED CHAMBERS

[75] Inventor: Le Roi E. Hutchings, Mount Prospect, Ill.

[73] Assignee: Universal Oil Products Company, Des Plaines, Ill.

[22] Filed: Nov. 29, 1974

[21] Appl. No.: 528,320

Related U.S. Application Data

[63] Continuation-in-part of Ser. No. 445,018, Feb. 22, 1974, abandoned.

[52] U.S. Cl. ............................ 208/146; 23/288 R
[51] Int. Cl.² .................. C10G 13/00; C10G 23/00
[58] Field of Search ....... 208/146; 23/288 R, 288 M

[56] References Cited
UNITED STATES PATENTS

| | | | |
|---|---|---|---|
| 2,089,038 | 8/1937 | Pyzel | 23/288 M |
| 3,218,249 | 11/1965 | Ballard et al. | 208/146 |
| 3,685,971 | 8/1972 | Carson | 23/288 R |
| 3,796,655 | 3/1974 | Armistead et al. | 208/146 |

Primary Examiner—Herbert Levine
Attorney, Agent, or Firm—James R. Hoatson, Jr.; Robert W. Erickson; William H. Page, II

[57] ABSTRACT

A distribution device for uniformly distributing a liquid-vapor feed intended for contact with a granulated solid bed in a packed chamber. Conduits direct individual streams of a homogenized, mixed-phase feed to points evenly distributed over the surface of a solid bed. Homogenization is effected by a perforated plate disposed above the conduits' inlets. Uniform flow within the several conduits is maintained by restriction orifices placed therein.

8 Claims, 2 Drawing Figures

DISTRIBUTION OF LIQUID-VAPOR FEEDS IN PACKED CHAMBERS

CROSS-REFERENCE TO RELATED APPLICATION

This application is a continuation-in-part of my co-pending application Ser. No. 445,018, filed Feb. 22, 1974, now abandoned.

BACKGROUND OF THE INVENTION

1. Field of the Invention

The field of art to which this invention pertains is hydrocarbon processing. Specifically, this invention relates to an improvement in the distribution of a heterogeneous fluid (liquid-vapor) over the surface of a solid bed of particulates for the purpose of effecting uniform contact with the particulate bed.

2. Prior Art

There are numerous commercial processes which involve contacting fluid hydrocarbon and other materials with a confined bed of solid particles for the purpose of physical or chemical treatment of the fluid materials. In many of these processes, the conditions of temperature and pressure, as well as the physical characteristics of the fluids, are such that upon entry into the particulate bed, the feed stream is substantially unvaporized or incompletely vaporized. Such processes include, among others, catalytic hydrocracking of various hydrocarbon oils, hydrodesulfurization of middle distillates and crude oil clean-up.

In the aforementioned processes, it is well known that the fluids entering the contact zone comprise gaseous hydrogen, vaporized hydrocarbons and liquid hydrocarbons. It is desired that these components be intimately admixed and intermingled in order to effect uniform treatment or reaction of the whole feed stream. The components must be evenly distributed over the particulate bed so that contact with the bed is uniform. Uniform contact is necessary to utilize the particulates to their maximum efficiency and so effect the desired treatment or conversion of the flow stream. Also, it is well known that reactions are encountered in the catalytic environments of the aforementioned processes which are exothermic, and a localized lack of hydrogen can result in regions within the particulate bed of excessively high temperatures and excessive coke deposition upon the particulate catalysts. This results from poor mixing and distribution of the gaseous, vaporous and liquid components of the feed stream. Good mixing and distribution have been found extremely difficult or impossible to achieve in mixed-phase fluid systems.

It is typical in the art, because of space velocity and residence time considerations, that the particulate bed be elongated in the direction of flow. This results in contact zones in the form of vertically elongated chambers, containing packed beds and employing downflow of fluids. There are many kinds of distributing means utilized in an effort to mix and evenly disseminate flow from the inlet point of packed chambers to the particulate beds therein, as, for example, various types of deflecting plates, distribution trays, etc. However, it has been shown that the usual types of distributing means do not provide uniform flow of a mixed-phase into the contact bed at low velocities. There is evidence that the dispersed hydrocarbon liquid coalesces rapidly, disassociating itself from the hydrogen, and thereby tending to distribute poorly and channel within the contact zone. Heavier viscous liquids tend to channel down the walls of the contact vessel, whereas less viscous liquids tend to channel in the central region of the particulate bed with the vaporized hydrocarbon and hydrogen. As a result, the temperature within the bed is non-uniform and localized hot spots occur which cause the undesirable results of non-selective hydrocracking and coke deposition.

The present invention solves these prior art problems of poor mixing and distribution. In the embodiments of my invention, the mixed-phase fluid is divided into a plurality of discrete portions, or streams, which are directed to points evenly distributed over the surface of the particulate bed.

OBJECTS AND EMBODIMENTS

It is an object of the present invention to improve the distribution of mixed-phase fluids in contact with particulate solids in packed chambers. It is a further object of this invention to improve the utility of the particulate solid used in packed hydroprocessing contact chambers.

Therefore, one embodiment of my invention affords, in a process for the catalytic conversion of a mixed-phase hydrocarbonaceous charge stock, the method of uniformly distributing said charge stock over a fixed bed of catalyst particles disposed in a reaction zone which comprises the steps of: (a) passing said charge stock to inlet means at the top of said reaction zone; (b) passing said charge stock through a perforated plate disposed within said inlet means; (c) discharging said charge stock from said perforated plate uniformly into the upper ends of a plurality of conduits, which conduits extend radially and downwardly toward said fixed bed and terminate within said bed at points uniformly spaced over the cross-section of the bed, said conduits having internally-placed flow-restricting means for equalizing flow in the various conduits; (d) passing the charge stock through said conduits, and discharging said charge stock from the conduits into said bed; and, (e) flowing said charge stock thence downwardly through said bed of catalyst particles.

BRIEF SUMMARY OF THE INVENTION

My invention involves an improvement in the distribution of a mixed-phase fluid for contact with a solid bed of particulates. The mixed phase is made homogeneous by passing it through a perforated plate. The homogeneous mixed phase is then divided into a plurality of small streams which pass through tubes penetrating the solid bed at points evenly distributed over the bed surface. Division of the mixed phase is effected by its passage through a tube sheet having a plurality of openings, each opening connecting to one tube. Orifices are disposed within the tubes to equalize pressure drop. The outlet ends of the tubes are covered with wire mesh to prevent entry of particulates.

Figure 1:
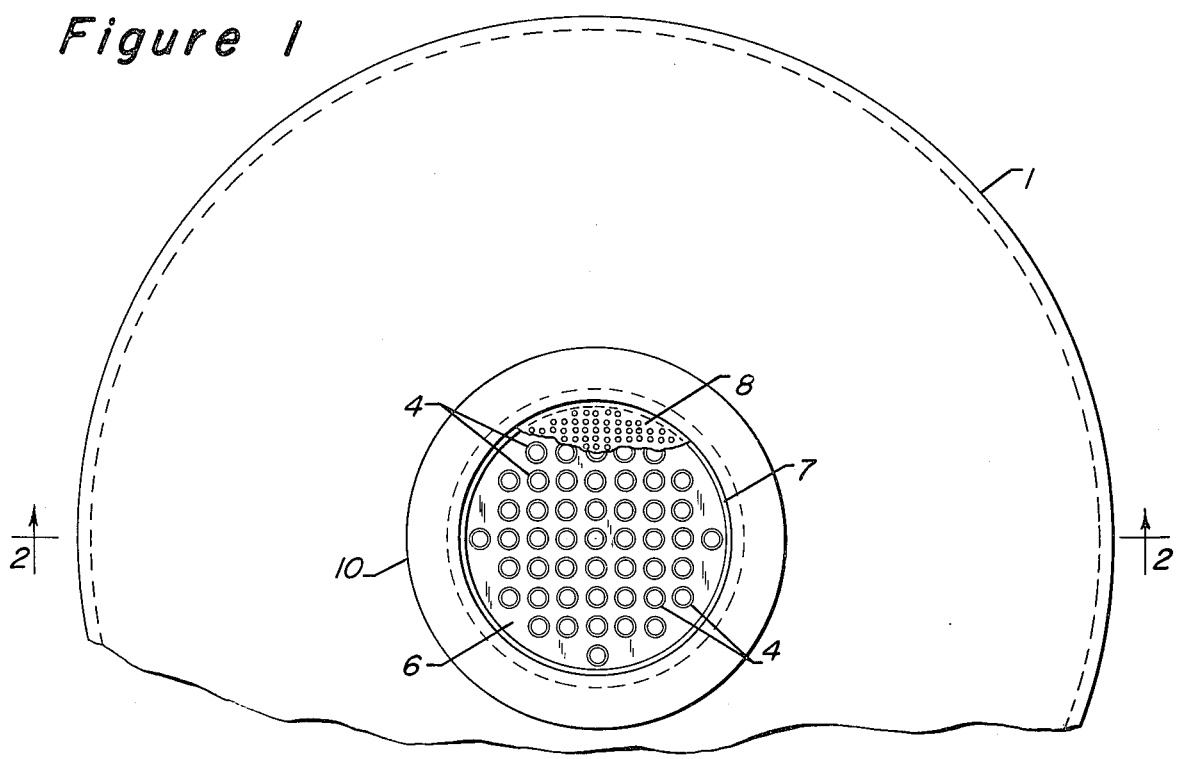
FIG. 1 is a partially sectioned plan view of the upper part of a packed chamber, showing inlet means 10.

With reference now to FIG. 1, inlet means 10 is shown as a circular flange. Perforated plate 8 is disposed within inlet means 10 and rests upon perforated plate support 7. Perforated plate support 7 is shown resting upon tube sheet 6. Perforated plate 8 has a multiplicity of equally sized and evenly spaced openings which are smaller and more numerous than the openings shown in tube sheet 6. The openings in tube sheet 6 are uniformly disposed across the surface of the tube sheet and contain the upper extremities of a plurality of conduits as is shown in FIG. 2.

Figure 2:
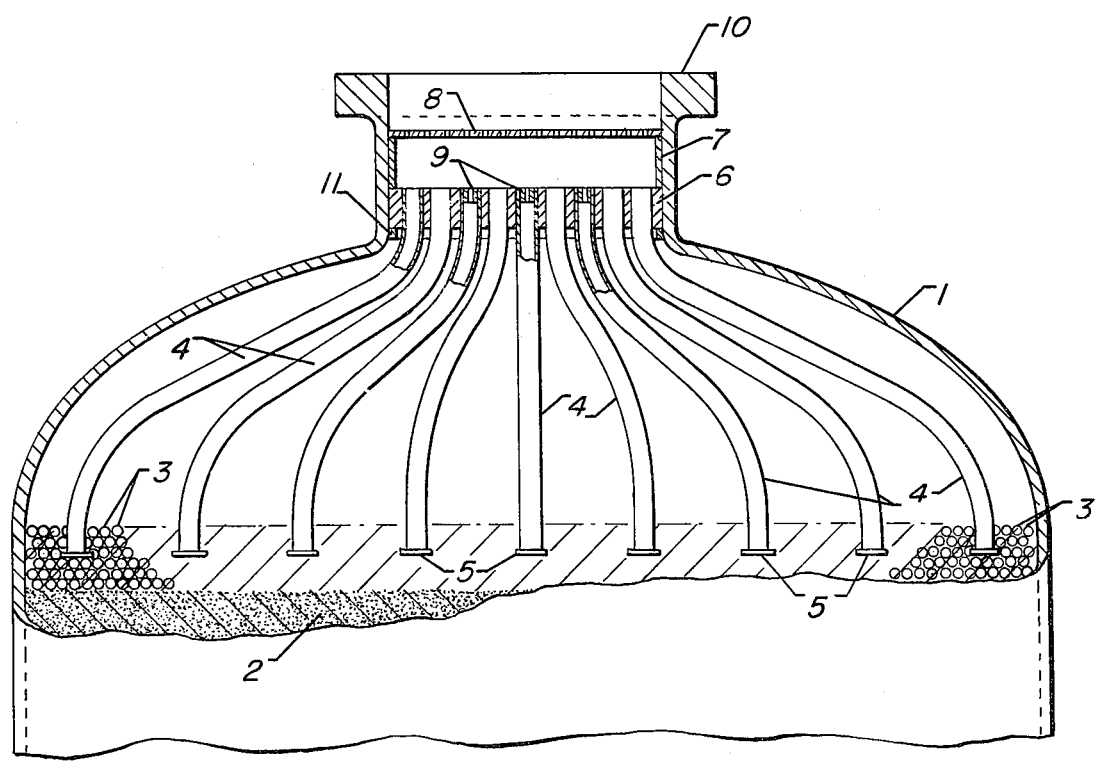
FIG. 2 is a sectional elevation view of a packed chamber, incorporating conduits 4 and solids bed components 2 and 3.

Referring now to FIG. 2, open-ended conduits 4 extend downward from within the openings in tube sheet 6 and penetrate a solids bed comprised of an upper layer of inert solid particulates 3 and a lower layer of particulated solid catalyst 2. Conduits 4 terminate at substantially the same depth in upper layer 3 at points evenly distributed over the cross-section of the upper layer. The lower ends of conduits 4 are covered with wire mesh coverings 5. The openings defined by the wire in wire mesh coverings 5 are smaller than the particles size of inert solid particulates 3. Tube sheet 6 rests upon tube sheet support 11. Disposed within the upper ends of conduits 4 are restriction orifices 9.

DETAILED DESCRIPTION OF THE INVENTION

In the chemical conversion or treatment of fluid hydrocarbons or other materials through contact with catalysts, it has become common practice to impregnate the catalytic agent upon a granulated or otherwise particulated solid. This provides extensive surface over which catalyst is available for participation in the desired reactions. These particulated solids are generally disposed in reaction chambers and confined in one or more discrete beds of particulates. The chambers are referred to as packed chambers.

It is necessary for the utilization of all the particulates in the solid bed, and for satisfactory processing, that the reactants entering a packed chamber be distributed evenly over the solid bed in order to pass uniformly therethrough. Where the reactant stream is single-phase, this presents only a problem of direction flow evenly to all areas of the bed surface. However, when reactants are a mixture of gas and liquid phases, it is necessary to assure that both phases are evenly distributed. My invention has as its primary object the improvement of distribution of these mixed phases.

To evenly distribute a mixed phase to a packed bed it is necessary to apportion liquid and vapor to all areas of the bed surface in the same proportion of liquid to vapor that is found in the total mixed phase. This can be done by creating a stable homogeneous dispersion of liquid globules within the vapor (or vice versa) and passing the dispersion to the bed surface. Dispersions of liquid and vapor are, however, inherently unstable mixtures. If given time, or subjected to changes in flow direction or impinged upon solid bodies, the liquid globules agglomerate and massive collections of the two phases appear. These collections have different fluid-flow characteristics by virtue of their different densities and viscosities, and they do not distribute evenly over the surface of a packed bed. In conventional down-flow packed chambers the liquid tends to flow along the chamber wall and the vapor tends to flow in the central portion of the bed. As the velocity of the mixed phase within the packed chamber decreases, such as in processes where reaction rates are slow and residence times high, the distribution becomes more uneven. Low velocities are encountered in, for example, packed bed processes operating at low feed rates or in processes which require long contact times for effecting the desired reactions, and it is here that my invention finds its greatest utility.

I have discovered that a low velocity, mixed phase can be evenly distributed by first homogenizing it and then passing discrete portions of it through a plurality of conduits to places evenly located over the cross-section of the packed bed. If the homogenized, mixed phase is left to distribute itself after homogenization, which is characteristic of prior art distribution devices, it quickly loses its homogeneity and uneven distribution results. However, the present invention mechanically conducts portions of the homogenized, mixed phase to the packed bed surface. Therefore, at the outlet of each conduit of my invention a stream of liquid and vapor, in the proper proportion, is introduced into the packed bed for pasage therethrough. This method eliminates the uneven distribution heretofore inherent in low velocity, mixed phase operations.

My method of distribution is applicable to downflow packed chambers of any cross sectional shape, however, because vertically-oriented, cylindrical chambers are in almost universal use in the hydrocarbon processing industry this type of chamber will be alluded to in the following teachings.

My invention provides, at the top of a cylindrical chamber, inlet means to receive incoming mixed phase fluids. Disposed within the inlet means are means for homogenization of the two-phase fluid mixture. The homogenizing means may comprise a perforated plate, a sintered metal sheet, a pad of wire mesh, a shallow bed of solid particulates or any other inert material which has the strength to withstand damage by a flowing mixed phase and which homogenizes the mixed phase by forcing the phase components to pass together through a multiplicity of flow paths. I prefer to use a perforated metal plate disposed normal to the direction of flow of the mixed phase. The perforations should be all of like size and shape and be uniformly distributed over the surface of the metal plate. The size of the perforations should be chosen as small as is practicable and the perforations should be as numerous as is feasible without reducing the strength of the plate beyond the aforementioned limit.

A mixed phase entering the top of a vertical cylindrical chamber must be moved radially in order that all parts of the cross section of the cylinder be served with incoming material. Below the perforated plate described above is a multiplicity of conduits which receive the homogenized, mixed phase and radially conduit discrete streams of the mixed phase within the conduits, thereafter discharging the discrete streams into the packed bed in a pattern of even distribution. The conduits should preferably be as numerous as is mechanically feasible to install, and the discharging extremities of these conduits should be situated in uniform distribution over the cross section of the packed bed.

It is obvious that the various conduits extending from the inlet means of the chamber to a subordinate packed bed will be of different lengths. For instance, the center-placed conduit directing homogenized mixed-phase material to the center of the packed bed below will be essentially short and straight. However, a conduit on the perifery of the relatively small inlet means which conducts material to the perifery of the relatively much larger chamber must of necessity be longer and curved or angled in order to deliver the material to the chamber's perifery. Although these conduits are of different lengths and configurations, they must conduct essentially the same rate of flow of material. This uniform rate of flow in all conduits is achieved by the use of restriction orifices of various sizes placed within certain conduits in order to provide equal pressure drop in all conduits. I prefer to leave the longest conduit without a restriction orifice and size restriction orifices for all other conduits such that the flowing pressure drop of each conduit is substantially equal to that of the longest conduit. This means that the most restrictive orifices will be placed in the shortest conduits, the restriction decreasing with increase in conduit length. This is a sizing calculation well within the abilities of those skilled in the art.

The following example will demonstrate a preferred embodiment of my invention. 9,000 Barrels per day of vacuum gas oil is converted in a hydrocracking process unit to diesel fuel, kerosene, naphtha, stabilized gasoline and butane. The reactor of the process is a conventional, cylindrical, vertically disposed, packed chamber, having a packed bed with a substantially horizontal upper surface. The upper section of this packed chamber is shown in FIG. 2 of the attached drawings. The vacuum gas oil is mixed with hydrogen and a recycle hydrocarbon stream. This mixture is heated and passed as feed to the packed chamber for contact with the packed bed therein. 5,325 pound moles of the feed enter inlet means 10 at approximately the following conditions of temperature and pressure: 824°F. and 2,650 pounds per square inch. This feed is a mixed phase, having approximately 10 volume percent liquid, and having roughly the following composition, expressed in mole percent: hydrogen, 85.0; $C_1 - C_6$, 11.9; $C_7+$, 3.1. The volume of catalyst in the packed bed is 3,205 cubic feet, and this corresponds to a liquid hourly space velocity of 0.7 $hr^{-1}$, based on the vacuum gas oil. This is an operation particularly well suited to the use of my invention by virtue of the mixed phase character of the feed and the low space velocity.

The mixed phase passes into inlet means 10 and through perforated plate 8. Impingement of liquid onto the perforated plate tends to cause distribution of the liquid thereon before passage through the multiplicity of openings in the plate. This effects homogenization of the liquid and vapor portions of the mixed phase as they pass through perforated plate 8 and enter the upper ends of the multiplicity of conduits 4. The upper ends of conduits 4 contain restriction orifices 9. The purpose of these orifices is to effect an equal pressure drop in all of the conduits. Equal pressure drop assures that substantially equal quantities of the homogenized, mixed phase will flow in all conduits. This would not be so without the orifices due to the unequal lengths of the various conduits. Restriction orifices are sized individually, according to well known fluid flow pressure drop correlations.

Discrete streams of homogenized, mixed phase feed now flow through conduits 4 and exit at their lower ends, which are submerged at points evenly distributed over the cross section of the packed bed. The evenly distributed feed then flows downwardly through the packed bed. The packed bed is preferably composed of a particulated solid catalyst and a layer of inert solid particulates above the upper catalyst level. These inert solid particulates may be composed of ceramic or other refractory material, and they permit further distribution of the streams after leaving the conduits and before entering the catalytic portion of the packed bed. The thickness of the inert layer is preferably 4 to 12 inches with the ends of conduits 4 submerged to a depth of half the layer's thickness. The inert solid particles should be larger than the solid catalyst particles but smaller than the openings in conduits 4. The outlets of conduits 4 are covered with wire mesh. The openings defined by the wire in the mesh should be smaller than the particle size of the inert solid to prevent its entry into the lower ends of the conduits. Conduits should preferably be installed as numerous as is mechanically feasible. The openings in perforated plate 8 should be at least twice as numerous as the conduits. Notice that tube sheet 6 rests upon tube sheet support 11. Tube sheet support 11 may be a ring of square or other cross section, welded to the wall of inlet means 10. Perforated plate 8 rests upon perforated plate support 7 which, in turn, rests upon tube sheet 6. Perforated plate support 6 may be a ring of rectangular cross section.

The distribution device of the present invention may be assembled as follows. Catalyst particles are placed within packed chamber 1 to the desired level. Inert solid particulates are then placed atop the catalyst to a level of one-half the thickness of the inert particulate layer. Conduits 4 are placed within the chamber with their lower ends resting upon the inert solid at evenly distributed points about the surface of the inert solid layer. More inert solid particles are then introduced into the chamber to cover the lower ends of the conduits and to establish the predetermined upper level of the inert solid layer. The upper ends of conduits 4 may be moved about within inlet means 10 in order to provide working spaced for introduction of inert solid particulates and smoothing of the final upper surface. Care should be exercised to avoid changing the predetermined placement of the conduits' lower ends. Tube sheet 6 is lowered into inlet means 10 and the upper ends of conduits 4 are guided into their respective openings in tube sheet 6, momentarily, for this purpose. Conduits 4 may be held in place in tube sheet 6 by means such as keys, retainer rings, etc. Restriction orifices 9 are placed within conduits 4. Perforated plate support 7 is lowered into place atop tube sheet 6, and perforated plate 8 is placed upon perforated plate support 7.

This invention is not limited to the aforementioned conditions of operation. It can be used to advantage in any mixed-phase distribution. However, it finds its greatest utility in distribution of mixed-phase feeds at liquid hourly space velocities from 0.2 to 1.0.

I claim as my invention:

1. In a process for the catalytic conversion of a mixed-phase hydrocarbonaceous charge stock, the method of uniformly distributing said charge stock over a fixed bed of catalyst particles disposed in a reaction zone which comprises the steps of:

a. passing said charge stock to inlet means at the top of said reaction zone;

b. passing said charge stock through a perforated plate disposed within said inlet means;

c. discharging said charge stock from said perforated plate uniformly into the upper ends of a plurality of conduits, which conduits extend radially and downwardly toward said fixed bed and terminate within said bed at points uniformly spaced over the cross-section of the bed, said conduits having internally placed flow-restricting means for equalizing flow in the various conduits;

d. passing the charge stock through said conduits, and discharging said charge stock from the conduits into said bed; and, e. flowing said charge stock thence downwardly through said bed of catalyst particles.

2. A distribution device for uniformly contacting a liquid-vapor feed with a packed bed of particulated solids disposed within a reaction zone, said solids bed having a substantially horizontal upper surface, which comprises in combination:

i. inlet means disposed above said upper surface of said solids bed;

ii. a substantially horizontal tube sheet mounted within said inlet means, said tube sheet having a plurality of openings uniformly disposed over the cross-section of said inlet means and having a first plurality of tubes and a second plurality of tubes, each of said tubes of said pluralities of tubes connecting to one of said openings in said tube sheet, said tubes extending downwardly and radially from said tube sheet and terminating at essentially the same depth within said solids bed, the lower ends of said tubes being disposed uniformly over the cross-section of the solids bed, said first plurality of tubes comprising tubes of shorter length and having internally placed flow-restricting means, said second plurality of tubes comprising tubes of greater length and being free from flow restricting means; and iii. a substantially horizontal perforated plate disposed within said inlet means above said tube sheet, said plate having a multiplicity of openings uniformly spaced over the cross-section of said inlet means.

3. The distribution device of claim 2 further characterized in that the lower ends of said tubes are covered with wire mesh.

4. The distribution device of claim 2 further characterized in that said solids bed comprises a particulated solid catalyst and, in combination therewith, a layer of inert solid partiulates extending from the upper catalyst level to a level above the lower ends of said conduits.

5. The distribution device of claim 4 further characterized in that said inert solid particulates have an average diameter at least as large as the average diameter of said solid catalyst particulates.

6. The distribution device of claim 3 further characterized in that openings defined by the wire in said wire mesh coverings are smaller than the particle size of said inert solid particulates.

7. The distribution device of claim 2 further characterized in that said internally placed flow-restricting means are restriction orifices.

8. The distribution device of claim 7 further characterized in that said restriction orifices have openings sized in direct proportion to the lengths of said tubes in said first plurality of tubes such that the restriction to flow presented by the combination of said first plurality of tubes and said restriction orifices is equal to the restriction to flow presented by said second plurality of tubes.

* * * * *